(12) United States Patent
Aoyama et al.

(10) Patent No.: US 8,006,099 B2
(45) Date of Patent: Aug. 23, 2011

(54) SECURITY MANAGEMENT METHOD, PROGRAM, AND INFORMATION DEVICE

(75) Inventors: Susumu Aoyama, Kawasaki (JP); Yuko Nakajima, Kawasaki (JP); Tomohiko Takahashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1058 days.

(21) Appl. No.: 11/132,188

(22) Filed: May 19, 2005

(65) Prior Publication Data

US 2006/0156028 A1    Jul. 13, 2006

(30) Foreign Application Priority Data

Jan. 4, 2005    (JP) ................................. 2005-000122

(51) Int. Cl.
*G06F 21/00* (2006.01)

(52) U.S. Cl. ........ 713/186; 713/168; 713/182; 713/193; 726/4; 726/5; 380/44; 380/247; 380/277

(58) Field of Classification Search .................. 713/186, 713/168, 193, 183, 165, 155, 156, 157, 167, 713/182, 189, 170, 177, 151, 184; 380/247, 380/277, 246, 285, 44, 259; 726/5, 4; 705/54, 705/51, 50, 64, 67–80; 340/5.53, 10.41, 340/10.6, 5.8; 382/115–119
See application file for complete search history.

(56) References Cited

U.S. PATENT DOCUMENTS

| 5,699,514 | A | 12/1997 | Durinovic-Johri et al. ................... 395/188.01 |
| 5,838,306 | A * | 11/1998 | O'Connor et al. ............ 345/163 |
| 2001/0036297 | A1 | 11/2001 | Ikegami et al. ............... 382/115 |
| 2002/0164057 | A1 * | 11/2002 | Kramer ........................ 382/124 |
| 2003/0005336 | A1 | 1/2003 | Poo et al. ...................... 713/202 |
| 2003/0054800 | A1 | 3/2003 | Miyashita |
| 2003/0093697 | A1 | 5/2003 | Lin ............................... 713/202 |

(Continued)

FOREIGN PATENT DOCUMENTS

EP    1 271 436    1/2003

(Continued)

OTHER PUBLICATIONS

Comparing passwords,tokens,and biometrics for user authentication, O'Gorman,L; Proceedings of IEEE, vol. 91,Issue 12, Dec. 2003 pp. 2019-2020.*

(Continued)

*Primary Examiner* — Taghi Arani
*Assistant Examiner* — Jason Lee
(74) *Attorney, Agent, or Firm* — Staas & Halsey LLP (57) ABSTRACT

In a state in which a fingerprint authentication mode is set, a fingerprint authentication unit authenticates a fingerprint input in accordance with an input instruction, performs unlocking if the authentication is successful, instructs another fingerprint input if the authentication fails, and determines unauthorized use and switches the mode to a PIN code authentication mode if the fingerprint authentication sequentially fails for a predetermined number of times. In a state of the PIN code authentication mode, a PIN code authentication unit authenticates a PIN code input in accordance with an input instruction, performs unlocking if the authentication is successful, instructs another PIN code input if the authentication fails, and determines unauthorized use and turns off the power source if the authentication sequentially fails for a predetermined number of times. Furthermore, when the power source is turned on again after the PIN code authentication unit has turned off the power source, the fingerprint authentication unit sets a state in which the fingerprint authentication mode is set, and keeps the fingerprint authentication mode even if the fingerprint authentication fails sequentially for a predetermined number of times.

3 Claims, 10 Drawing Sheets

U.S. PATENT DOCUMENTS

| | | | |
|---|---|---|---|
| 2003/0115490 A1* | 6/2003 | Russo et al. | 713/202 |
| 2003/0212871 A1 | 11/2003 | Suzuki et al. | 711/164 |
| 2004/0250074 A1* | 12/2004 | Kilian-Kehr | 713/172 |
| 2005/0005131 A1* | 1/2005 | Yoshida et al. | 713/183 |
| 2005/0029353 A1* | 2/2005 | Isemura et al. | 235/454 |
| 2005/0044382 A1* | 2/2005 | McKeeth | 713/182 |
| 2005/0218215 A1* | 10/2005 | Lauden | 235/380 |
| 2006/0112275 A1* | 5/2006 | Jeal et al. | 713/183 |

FOREIGN PATENT DOCUMENTS

| | | |
|---|---|---|
| JP | 63-196991 | 8/1988 |
| JP | 9-147104 | 6/1997 |
| JP | 2000-174894 | 6/2000 |
| JP | 2002-288137 | 10/2002 |
| JP | 2003-006168 | 1/2003 |
| JP | 2003-85561 | 3/2003 |
| JP | 2003-91509 | 3/2003 |
| JP | 2004-94726 | 3/2004 |
| JP | 2004-102635 | 4/2004 |

OTHER PUBLICATIONS

European Search Report dated Oct. 10, 2006 for corresponding European Application No. EP 05253088.8-1229.

Japanese Patent Office Notification of Reasons for Refusal mailed Mar. 2, 2010 for corresponding Japanese Patent Application No. 2005-000122.

Japanese Office Action dated May 25, 2010 and issued in corresponding Japanese Patent Application 2005-000122.

* cited by examiner

SECURITY MANAGEMENT METHOD, PROGRAM, AND INFORMATION DEVICE

This application is a priority based on prior application No. JP 2005-122, filed Jan. 4, 2005, in Japan.

BACKGROUND OF THE INVENTION

1. Field of the Invention

The present invention relates to a security management method, a program, and an information device of a device such as a portable phone comprising a fingerprint authentication function, and particularly relates to a security management method, a program, and an information device comprising a fingerprint-only authentication function.

2. Description of the Related Arts

Conventionally, a fingerprint authentication function has been used in security management of portable terminal devices such as portable phones and PDAs, and a conventional fingerprint authentication function has been used in combination with a PIN code authentication function.

In the fingerprint authentication function used in combination with a PIN code, in order to recover failure in fingerprint authentication, when fingerprint authentication fails, for example, sequentially for ten times, it is switched to PIN code authentication. Therefore, even if fingerprint authentication sequentially fails due to, for example, a stain on a fingerprint sensor, since it automatically switches to PIN code authentication, the user can perform unlocking by inputting a PIN code, thereby starting, for example, applications. Furthermore, in order to prevent unlocking performed by unauthorized use, when it is switched to PIN code authentication as a result of fingerprint authentication failure, when PIN code authentication fails, for example, sequentially for five times, the power source is forcibly turned off, such that the device cannot be used any more.

However, in such conventional security management method by means of fingerprint authentication, although the power source is forcibly turned off when fingerprint authentication and PIN code authentication, which is used in combination, fail, when the power source is turned on again, fingerprint authentication and PIN code authentication can be repeatedly and sequentially performed until it reaches to a set number of failure times. If a four-digit PIN code has been set for combination use, even though a fingerprint authentication function is provided, the security performance is the same level as PIN code authentication. Therefore, there resides a problem that the high security performance by virtue of fingerprint authentication is not fully utilized.

SUMMARY OF THE INVENTION

According to the present invention, there are provide a security management method, a program, and an information device for enhancing the security performance of fingerprint authentication.

The present invention provides an information device security management method. In the security management method which can limit access to certain information by use of fingerprint authentication, the present invention includes a fingerprint authentication step of performing fingerprint authentication, and, if fingerprint authentication fails for a predetermined number of times, enabling PIN code authentication; and, after the fingerprint authentication step is switched to PIN code authentication, a PIN code authentication step of performing PIN code authentication, and, if PIN code authentication fails for a predetermined number of times, enabling an authentication failure flag such that only the authentication by means of fingerprint authentication can be performed.

Herein, in the PIN code authentication step, the number of failure times of PIN code authentication is stored in a non-volatile matter, and, if a power source is turned off before the number of PIN code authentication times reaches a predetermined number and then the power source is turned on again, the number of failure times of PIN code authentication is counted with the stored number of failure times serving as the initial value. In the fingerprint authentication step, when it is to be switched to the PIN code authentication, the number of failure times of fingerprint authentication is cleared.

In the information device security management method of the present invention, the number of failure times of the PIN code authentication for determining unauthorized use is set to a number fewer than the number of failure times of the fingerprint authentication for determining unauthorized use.

The present invention provides a program executed by a computer of an information device.

The program of the present invention causes the computer of the information device to execute a fingerprint authentication step of performing fingerprint authentication, and, if fingerprint authentication fails for a predetermined number of times, enabling PIN code authentication; and, after the fingerprint authentication step is switched to PIN code authentication, a PIN code authentication step of performing PIN code authentication, and, if PIN code authentication fails for a predetermined number of times, enabling an authentication failure flag such that only the authentication by means of fingerprint authentication can be performed.

The present invention provides a security management device that can limit access to certain information by use of fingerprint authentication.

The security management device of the present invention includes a fingerprint authentication unit whichr performing fingerprint authentication, and, if fingerprint authentication fails for a predetermined number of times, enabling PIN code authentication; and, after the fingerprint authentication unit switches to PIN code authentication, a PIN code authentication unit whichr performing PIN code authentication, and, if PIN code authentication fails for a predetermined number of times, enabling an authentication failure flag such that only the authentication by means of fingerprint authentication can be performed.

Noted that, details of the program and the security management device of the present invention are basically same as that of the security management method of the present invention.

According to the present invention, by implementing authentication utilizing only a fingerprint(s), high security performance by virtue of fingerprint authentication can be fully utilized. Moreover, PIN code authentication is provided as a backup in a case in which fingerprint authentication does not normally work due to, for example, a stain on a sensor or the like or a failure, thereby facilitating recovery in a case in which fingerprint authentication does not work. By virtue of security enhancement implemented by providing fingerprint authentication and PIN code authentication as a backup, when, due to unauthorized use, fingerprint authentication fails for a predetermined number of times and it is switched to PIN code authentication, and PIN code authentication also fails for a predetermined number of times, the authentication failure flag is turned on in a non-volatile matter. Thereafter, authentication is performed only in the fingerprint authentication mode. As a result, chances of unauthorized use by means of further PIN code input can be eliminated.

Moreover, when, due to unauthorized use, PIN code input is repeated for several times and fails in a state in which it has been switched from fingerprint authentication to PIN code authentication, the number of failure times of PIN code authentication is stored in a non-volatile matter in order to deal with unauthorized use in which the power source is turned on again before it reaches the predetermined number of times. Therefore, after the power source is turned on again, when it is switched to that of PIN code after fingerprint authentication fails for a predetermined number of times, the number of failure times is counted with the number of failure times up to the previous time stored in a non-volatile matter serving as the initial value. Accordingly, even if the power source is turned on again, the number of failure times of PIN codes is always limited to the predetermined number of times, which has been set in advance, at which point authentication is fixed only to fingerprint authentication. Therefore, even if PIN code authentication is provided as a backup, security can be sufficiently enhanced.

The above and other objects, features, and advantages of the present invention will become more apparent from the following detailed description with reference to the drawings.

DETAILED DESCRIPTION OF THE PREFERRED EMBODIMENTS

Figure 1:
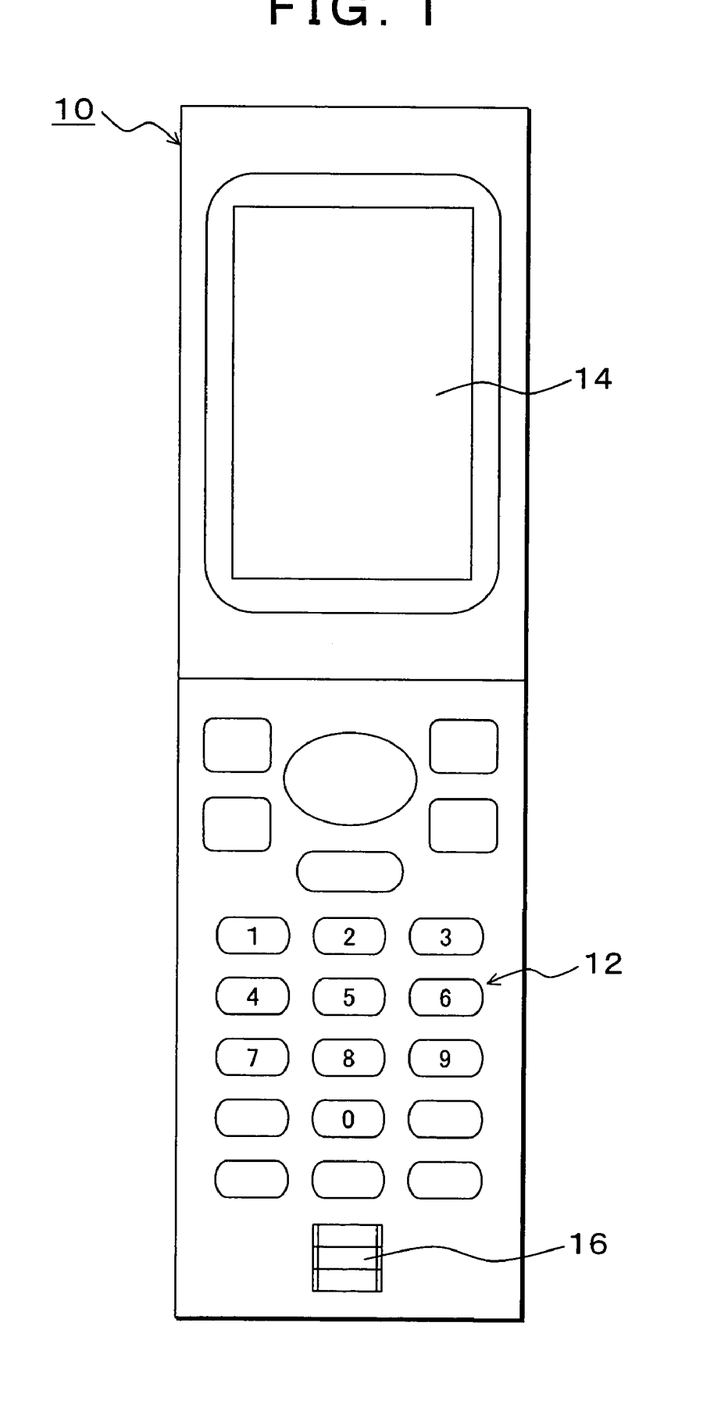
FIG. 1 is an explanatory view of a portable phone serving as a portable terminal device to which the present invention is applied.

FIG. 1 is an explanatory view of a portable terminal device to which the present invention is applied, wherein a portable phone is shown as an example. In FIG. 1, a portable terminal device 10 of the present invention is, for example, a portable phone, and has an input operation unit 12 and a liquid crystal display 14, wherein a fingerprint sensor 16 is provided below the input operation unit 12.

Figure 2:
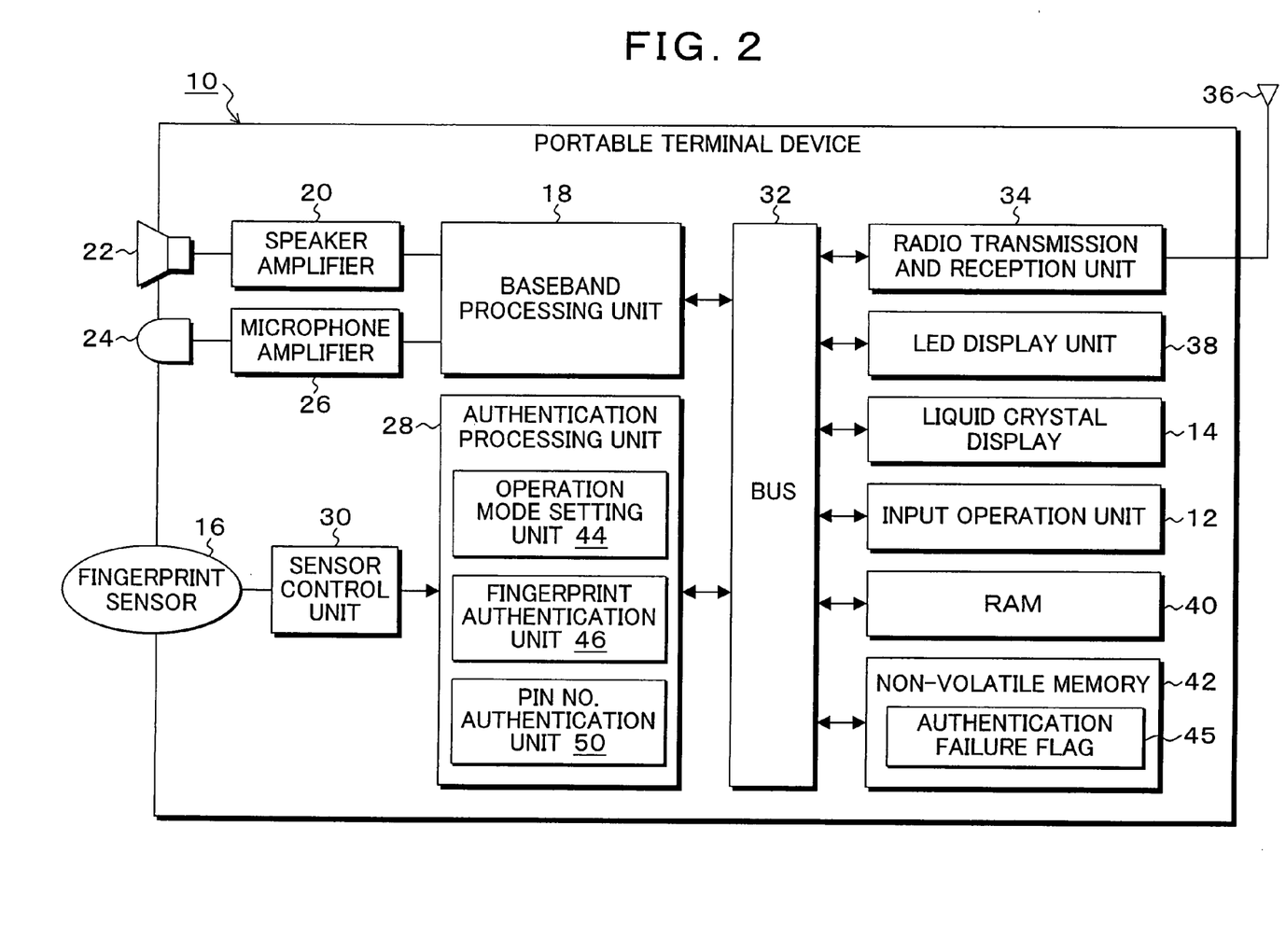
FIG. 2 is a block diagram of a portable terminal device provided with a functional configuration of the present invention.

FIG. 2 is a block diagram of a portable terminal device provided with a functional configuration of the present invention, wherein a functional configuration corresponding to the portable phone of FIG. 1 is employed as an example. In FIG. 2, a baseband processing unit 18 is provided in the portable terminal device 10. Audio signals output from the baseband processing unit 18 are amplified at a speaker amplifier 20, and supplied to a speaker 22. Meanwhile, audio signals from a microphone 24 are amplified at a microphone amplifier 26, and then, input to the baseband processing unit 18.

An authentication processing unit 28 is provided in the portable terminal device 10, and output signals from a sensor control unit 30 which is provided for a fingerprint sensor 16 are input to the authentication processing unit 28. Provided for the authentication processing unit 28 via a bus 32 are the baseband processing unit 18, a radio transmission and reception unit 34, an LED display unit 38, the liquid crystal display 14, the input operation unit 12, a RAM 40, and a non-volatile memory 42 employing a flash memory. An antenna 36 is provided at the radio transmission and reception unit 34, and performs transmission and reception processings in accordance with mobile communication of the W-CDMA method.

Functions of the authentication processing unit 28 are implemented through executing processes of an authentication processing program performed by a MPU. The authentication processing unit 28 is provided with the functions of an operation mode setting unit 44, a first fingerprint authentication unit 46, a second fingerprint authentication unit 48, and a PIN code authentication unit 50. The operation mode setting unit 44 carries out fingerprint registration, which is necessary for fingerprint authentication, and selection and setting of operation modes. The operation modes which can be set by the operation mode setting unit 44 include following three modes.

(1) Authentication mode utilizing only a fingerprint(s)
(2) Authentication mode utilizing a fingerprint(s) in combination with a PIN code
(3) Authentication mode by means of a PIN code without utilizing a fingerprint These authentication operation modes are subjected to selection through the operations performed when the user initially registers a fingerprint, and a fingerprint authentication process of the present invention is implemented as a function of the first fingerprint authentication unit 46, the second fingerprint authentication unit 48, and the PIN code authentication unit 50 when the above described "authentication mode utilizing only a fingerprint" of (1) is selected. On the other hand, the above described "authentication mode utilizing a fingerprint in combination with a PIN code" of (2) and "authentication mode by means of a PIN code without utilizing a fingerprint" of (3) are same as conventional authentication operation modes.

In the "authentication mode utilizing only a fingerprint" provided by the present invention, the fingerprint authentication unit 46 and the PIN code authentication unit 50 have the following processing functions.

Firstly, in a state of the fingerprint authentication mode, the fingerprint authentication unit 46 performs authentication by subjecting a fingerprint input from the fingerprint sensor 16 in accordance with an input instruction utilizing the screen of the liquid crystal display 14 to comparison and collation with a previously registered fingerprint. If authentication is successful, it unlocks an appropriate application which requires an authentication process such as an application of a FeliCa chip; and if authentication fails, it instructs to input a fingerprint once again, and if fingerprint authentication fails sequentially for a predetermined number of times, for example, sequentially for ten times, it switches the mode to the PIN code authentication mode.

Herein, fingerprint authentication limits access to certain information, and the information serving as the object is appropriate information that requires security such as an address book, personal information, electronic money, and electronic value.

In the state of the PIN code authentication mode which has been switched from the fingerprint authentication mode, the PIN code authentication unit 50 performs authentication by subjecting a PIN code, which has been input from the input operation unit 12 in accordance with an input instruction by means of screen display on the liquid crystal display 14, to comparison and collation with a previously registered PIN code; and performs unlocking if authentication is successful, and instructs to input a PIN code once again if authentication fails. If authentication fails sequentially for a predetermined number of times, for example, sequentially for five times, the PIN code authentication unit determines that it is unauthorized use, turns on an authentication failure flag 45 and stores it in the non-volatile memory 42, and then, forcibly turns off the power source of the portable terminal device 10. Furthermore, at each failure, the PIN code authentication unit 50 stores the number of failure times of PIN code authentication in the non-volatile memory 42 as a number of PIN code failure times 72, and, when counting of the number of failure times of PIN code authentication is to be started, performs counting while always using the number of PIN code failure times 72 in the non-volatile memory 42 as the initial value. Moreover, when the power source is turned on again after the PIN code authentication unit 50 has determined unauthorized use and forcibly turned off the power source, the fingerprint authentication unit 46 sets the fingerprint authentication mode again, and, in this case, keeps the fingerprint authentication mode no matter how many times fingerprint authentication corresponding to fingerprint input fails. More specifically, when the power source is turned on again, the fingerprint authentication unit 46 checks the authentication failure flag 45 which has been stored in the non-volatile memory 42, and, since the authentication failure flag 45 has been set to on in this case, recognizes that it is in a defense state in which the power source has been forcibly turned off against unauthorized use, and keeps the fingerprint authentication mode all the time no matter how many times fingerprint authentication fails.

As described above, when the power source is turned on again after the power source is forcibly turned off since fingerprint authentication fails sequentially for ten times and then PIN code authentication fails sequentially for five times, no matter how many times authentication corresponding to fingerprint input fails, the fingerprint authentication unit 46 no longer switches the mode to the PIN code authentication mode, which is a backup for the fingerprint authentication, but keeps the operation mode in which only fingerprint authentication is performed.

As a result, when the portable terminal device 10 is to be subjected to unauthorized use, ten times of fingerprint authentication failure and subsequent five times of PIN code authentication failure cause the power source to be forcibly turned off, and when the power source is turned on again, the mode is fixed to only the fingerprint authentication mode, wherein, if the fingerprint is that of an unauthorized user, authentication certainly fails, and the operation mode of fingerprint authentication is yet kept no matter how many times fingerprint authentication fails. Therefore, unauthorized users cannot perform cracking by use of a PIN code, and have no choice any more but give up unlocking through unauthorized use, therefore, security by means of fingerprint authentication can be significantly improved.

Since the PIN code authentication unit 50 stores the number of PIN code failure times 72 in the non-volatile memory 42, in unauthorized use, even when unauthorized input of PIN codes is to be started again from the beginning by turning the power source on over again before the number of failure times of PIN code authentication reaches five, the number of PIN code failure times 72 up to the previous time stored in the non-volatile memory 42 is read as the initial value, so as to count the number of failure times. Therefore, even when the power source is turned on over again, unauthorized input of PIN codes is performed only five times at most. Then, the mode is fixed to the fingerprint authentication mode, therefore unauthorized users cannot carry out cracking by use of PIN codes, and have no choice any more but give up unlocking through unauthorized use, thereby also significantly improving the security also regarding PIN code authentication.

Figure 3:
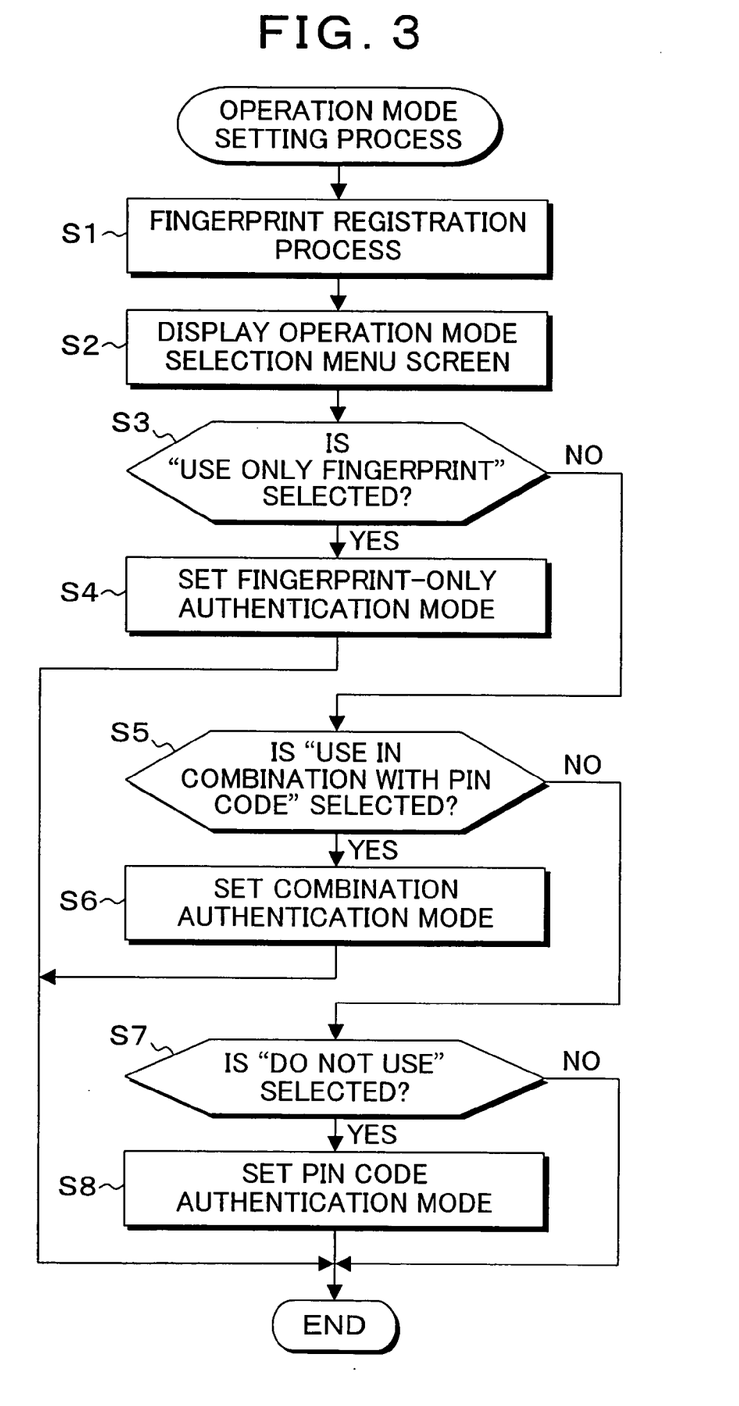
FIG. 3 is a flow chart of an operation mode setting process in the authentication processing unit of FIG. 2.
Figure 4A:
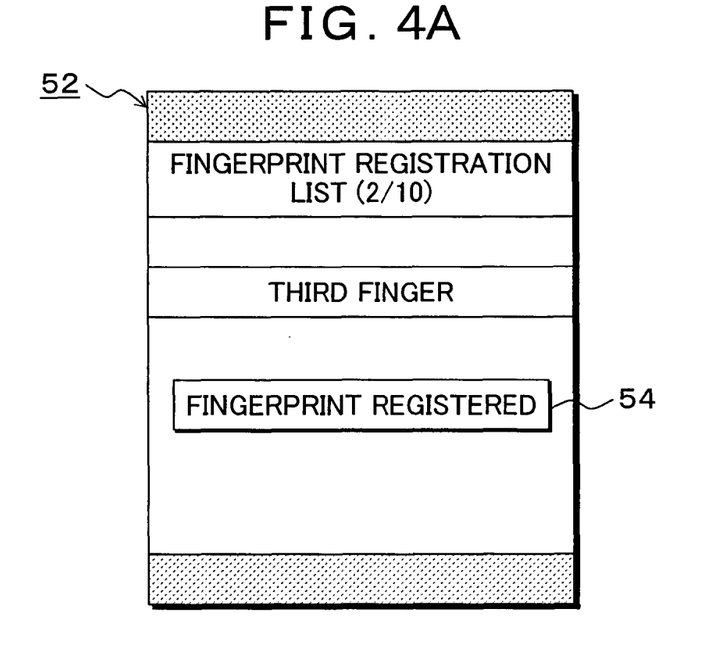
FIGS. 4A and 4B are screen explanatory views corresponding to the operation mode setting process of FIG. 3.

FIG. 3 is a flow chart of the processing operations of the operation mode setting unit 44 in the authentication processing unit 28 of FIG. 2. In FIG. 3, the operation mode setting unit 44 performs a fingerprint registration process in a step S1. In the fingerprint registration process, for example, as shown in a fingerprint authentication registration screen 52 of FIG. 4A, a "third finger" is designated as the finger for performing fingerprint registration; a reading operation of a fingerprint is performed when, in a state of above described screen display, the fingertip of a third finger is placed on the fingerprint sensor 16 of the portable terminal device 10 shown in FIG. 1 and slidably pulled; a fingerprint image synthesized from segmented scanned images in accordance with the movement of the finger is generated at the sensor control unit 30 of FIG. 2; and, furthermore, fingerprint authentication data is generated by extracting characteristics of the finger print such as branches and end points from the fingerprint image, thereby registering the fingerprint in, for example, a registration area of the non-volatile memory 42. When such fingerprint registration is completed, a registration completion message 54 of FIG. 4A is displayed.

Figure 4B:
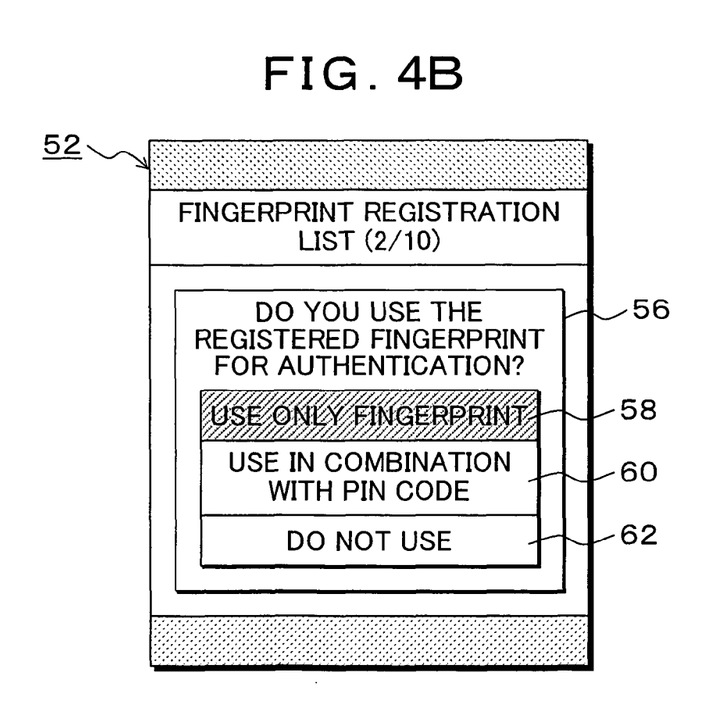

Subsequently, in a step S2 of FIG. 3, an operation mode selection menu screen is displayed, for example, as shown in a fingerprint authentication registration screen 52 of FIG. 4B. In the fingerprint authentication registration screen 52, a message saying "do you use the registered fingerprint for authentication?" is displayed, and below that displayed is an operation mode selection menu 56 comprising selection frames 58, 60, and 62.

Among these, the fingerprint authentication process according to the present invention is set when "use only fingerprint" shown in the selection frame 58 is selected. Other than this, "use in combination with PIN code" of the selection frame 60 or "do not use" of the selection frame 62 can be also selected. The operation modes of the selection frames 60 and 62 are same as conventional operation modes.

Subsequently, in a step S3 of FIG. 3, whether "use only fingerprint" is selected or not is checked, and, when selection thereof is determined, the fingerprint-only authentication mode is set in a step S4. Meanwhile, in a step S5, when it is determined that "use in combination with PIN code" is selected, the combination authentication mode is set in a step S6. When "do not use" is selected in a step S7, the PIN code authentication mode is set in a step S8.

Figure 4C:
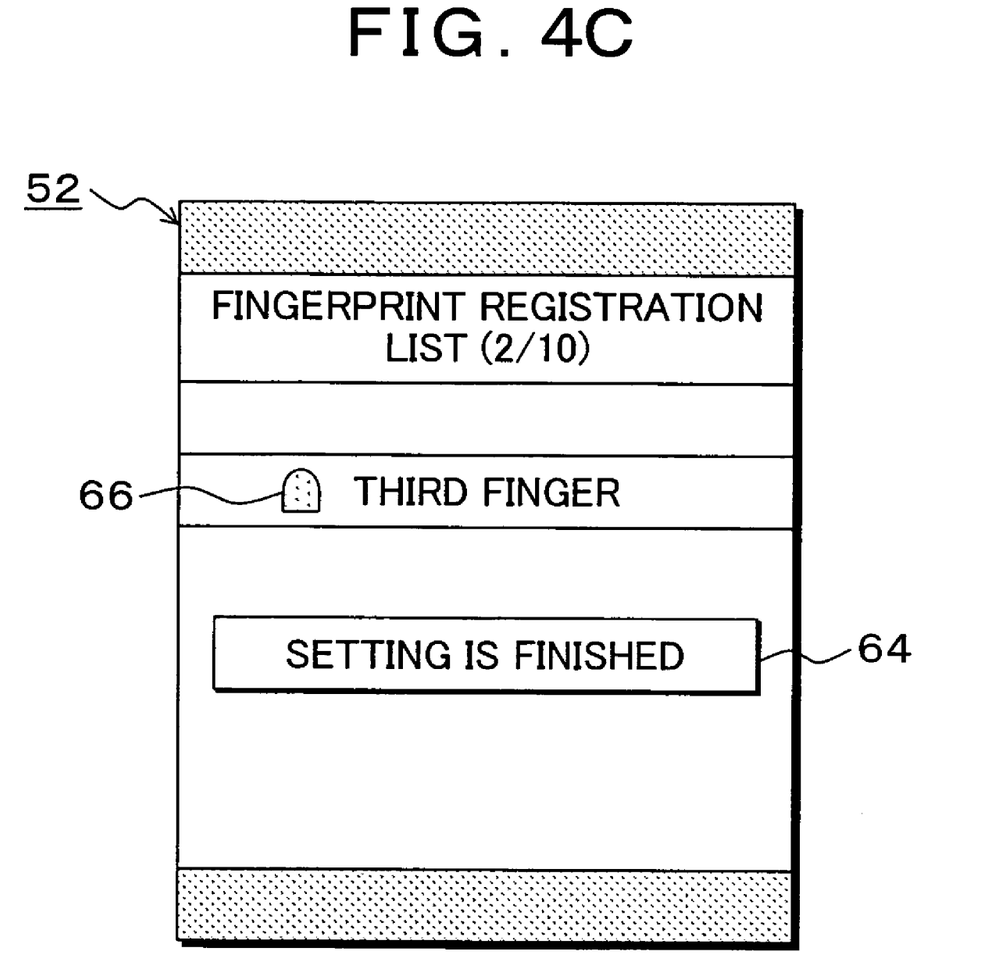
FIG. 4C is a screen explanatory view subsequent to FIGS. 4A and 4B.

When setting is finished, the screen is switched to a fingerprint authentication registration screen 52 of FIG. 4C, wherein "setting is finished" is displayed as a setting completion message 64, and an icon 66 indicating fingerprint registration of a "third finger" is also displayed.

Figure 5A:
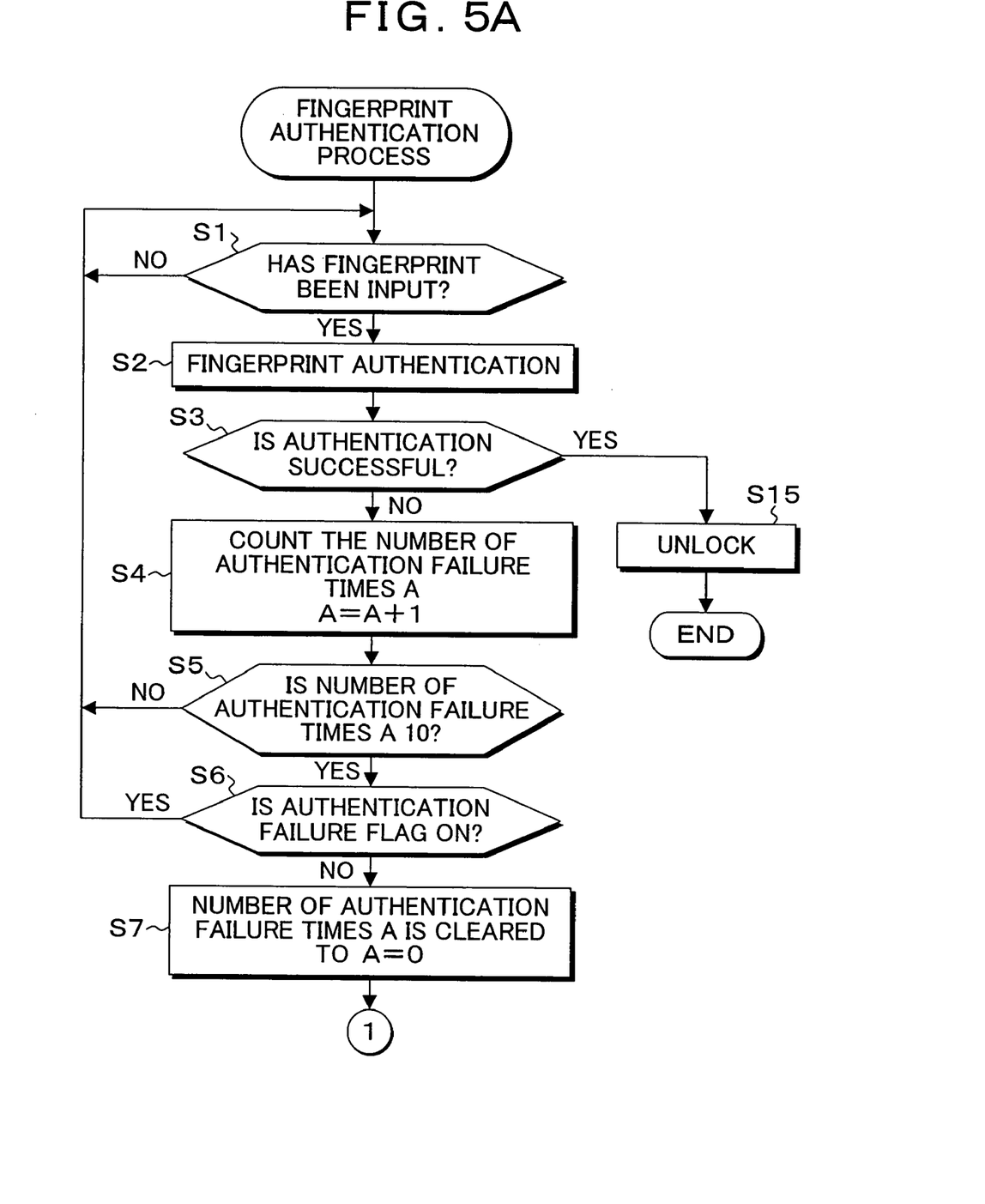
FIGS. 5A and 5B are flow charts of a fingerprint authentication process according to the present invention when "use only fingerprint" is set as the operation mode.
Figure 5B:
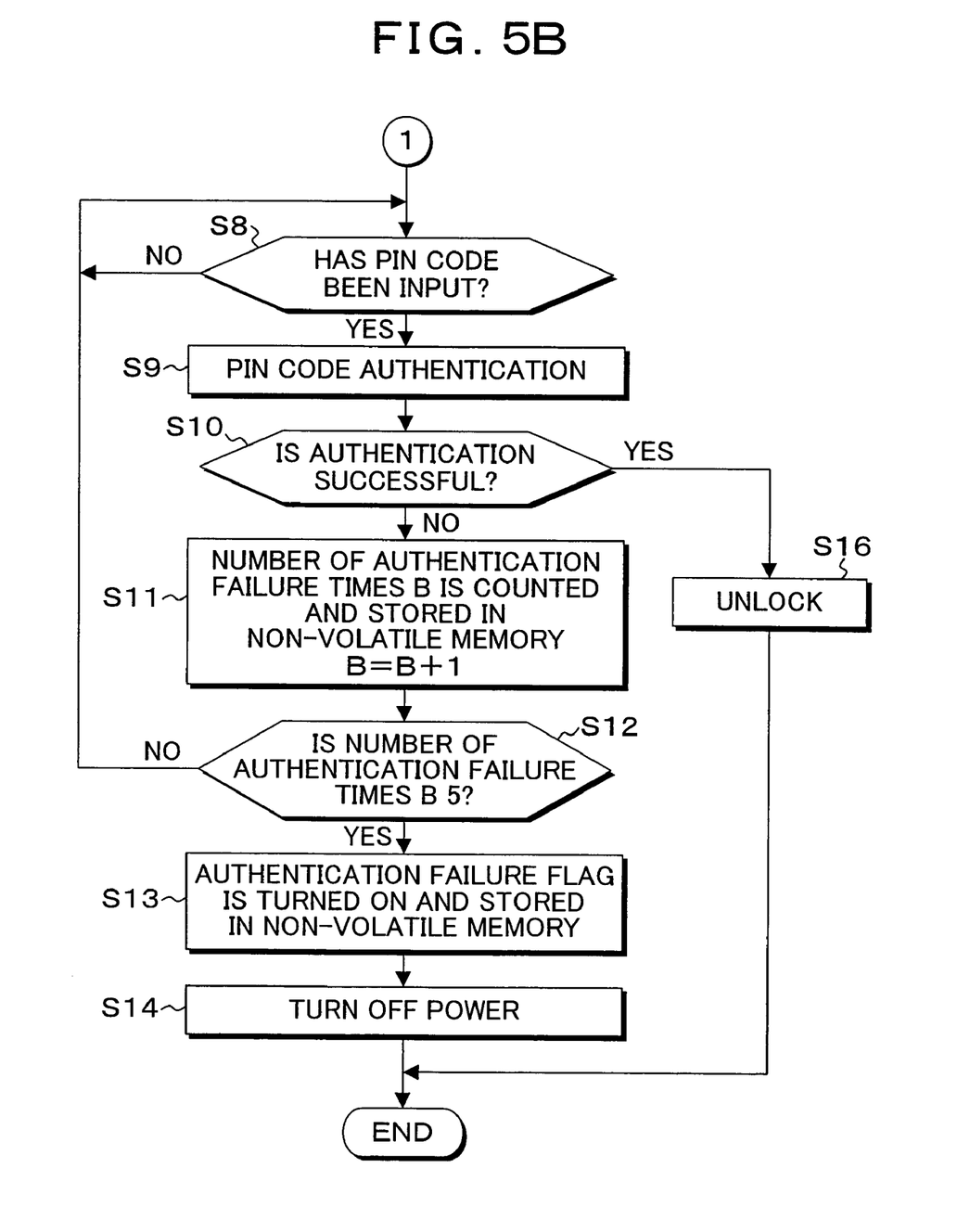

FIGS. 5A and 5B are flow charts of the fingerprint authentication process of the present invention when "use only fingerprint" is set as the operation mode. In FIGS. 5A and 5B, in the fingerprint authentication process according to the present invention, whether a fingerprint has been input or not is checked in a step S1, wherein if a fingerprint has been input, the process proceeds to a step S2 in which fingerprint authentication for authenticating the input fingerprint with respect to the previously input fingerprint is performed.

When, as a result of the fingerprint authentication, successful authentication is determined in a step S3, the process proceeds to a step S15 and unlocking is performed. When authentication failure is determined in the step S3, the process proceeds to a step S4, wherein the number of authentication failure times A is counted. The number of authentication failure times A is A=0 in the initial state, and is counted up one by one upon authentication failure. Subsequently, in a step S5, whether the number of authentication failure times A has reached ten or not is checked, and, until it reaches ten times, the process returns to the step S1 wherein fingerprint authentication by means of fingerprint input is repeated. When the number of authentication failure times A has reached ten times in the step S5, the process proceeds to a step S6, wherein whether authentication failure flag is on or not is checked. Note that the authentication failure flag 45 is stored in the non-volatile memory 42 of FIG. 2.

Herein, since the authentication failure flag is off in the initial state, the process proceeds to a step S7 wherein the number of authentication failure times A is cleared such that A=0. Then, the process proceeds to the process of a step S8. In the step S8, a message urging PIN code input is displayed on the liquid crystal display 14, and, when a PIN code is input in accordance with the message, the input is determined; and, in a step S9, a PIN code authentication process for collating the input PIN code with a previously registered PIN code is performed. When, regarding this authentication result, successful authentication is detected in a step S10, the process proceeds to a step S16 wherein unlocking is performed.

When the authentication fails, the process proceeds to a step S11 wherein the number of authentication failure times B is counted. The number of authentication failure times B is B=0 in the initial state, and counted up one by one upon each failure. The number of authentication failure times B is stored, at each failure, in the non-volatile memory 42 as the number of PIN code failure times 72, and can be maintained even when the power source is turned off.

Then, in a step S12, whether the number of authentication times B has reached five or not is checked. When it is less than five times, the process returns to the step S8, and authentication by means of PIN code input is repeated. When the number of authentication failure times B has reached five in the step S12, it is determined to be unauthorized use, and the process proceeds to a step S13 wherein the authentication failure flag is turned on and stored in the non-volatile memory 42. Then, in a step S14, the power source is forcibly turned off.

When the power source is turned on again after the power source has been forcibly turned off in the step S14 in accordance with the determined result of unauthorized use, the process from the step S1 is started. More specifically, a message urging fingerprint input is displayed on the liquid crystal display 14 in the step S1; when a fingerprint is input in accordance with the message, fingerprint authentication for collating it with a previously input fingerprint is performed in the step S2; since it is unauthorized use in this case, authentication failure is determined in the step S3; and the number of authentication failure times A is counted again from a state in which A=0 in the step S4.

Then, until the number of authentication times A reaches ten in the step S5, authentication by means of fingerprint input is repeated from the step S1. When the number of failure times reaches ten, the process proceeds to the step S6 wherein whether the authentication failure flag is on or not is checked.

In this case, the authentication failure flag has been set to on in the process of the step S13 in the previous fingerprint authentication process. Therefore, the process does not progress to the authentication process by use of a PIN code which is provided so as to start from the step S7 as a recovery process for fingerprint authentication failure, and the fingerprint authentication process is repeated from the step S1.

In a case in which, in unauthorized use, the power source is turned on again in order to start over the process in a state wherein the number of failure times is, for example, four during the PIN code authentication process of the steps S8 to S12, the number of PIN code failure times B at this time is stored in the non-volatile memory 42.

Therefore, when the power source is turned on again and the process proceeds to the PIN code authentication process after ten times of fingerprint authentication failure, in a first time of PIN code authentication failure, the number of authentication failure times B becomes B=5 in the step S12 due to the counting in which the previous number of failure times, four, stored in the non-volatile memory 42 serves as the initial value, the authentication failure flag is stored in the non-volatile memory 42 in the step S13, and the power source is forcibly turned off in the step S14. Thereafter, since the authentication failure flag has been turned on, the process is fixed only to the authentication of the steps S1 to S6 by means of fingerprint.

Note that, when fingerprint authentication is successful thereafter, the number of PIN code failure times B and the authentication failure flag stored in the non-volatile memory 42 are cleared.

Although the power source is forcibly turned off in the step S14 of FIGS. 5A and 5B when the number of failure times of PIN code authentication reaches five, in another embodiment, the authentication lock state may be maintained without turning off the power source. Certainly, in this case, when the power source is turned on again, the process from the step s1 is resumed in a state in which the turned on authentication failure flag and the number of PIN code failure times are stored in the non-volatile memory 42.

Figure 6A:
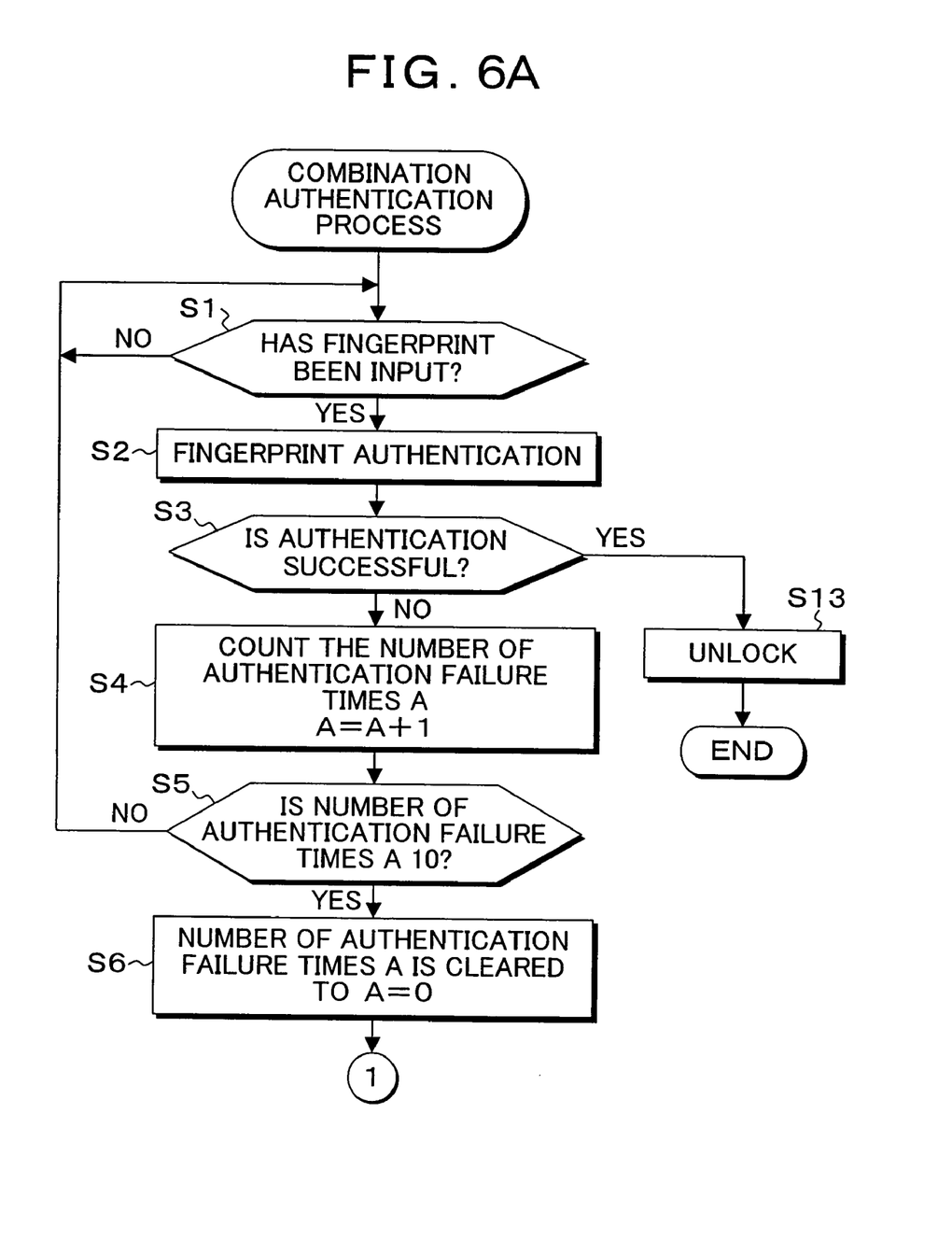
FIGS. 6A and 6B are flow charts of the combination authentication process when "use in combination with a PIN code" is set as the operation mode.
Figure 6B:
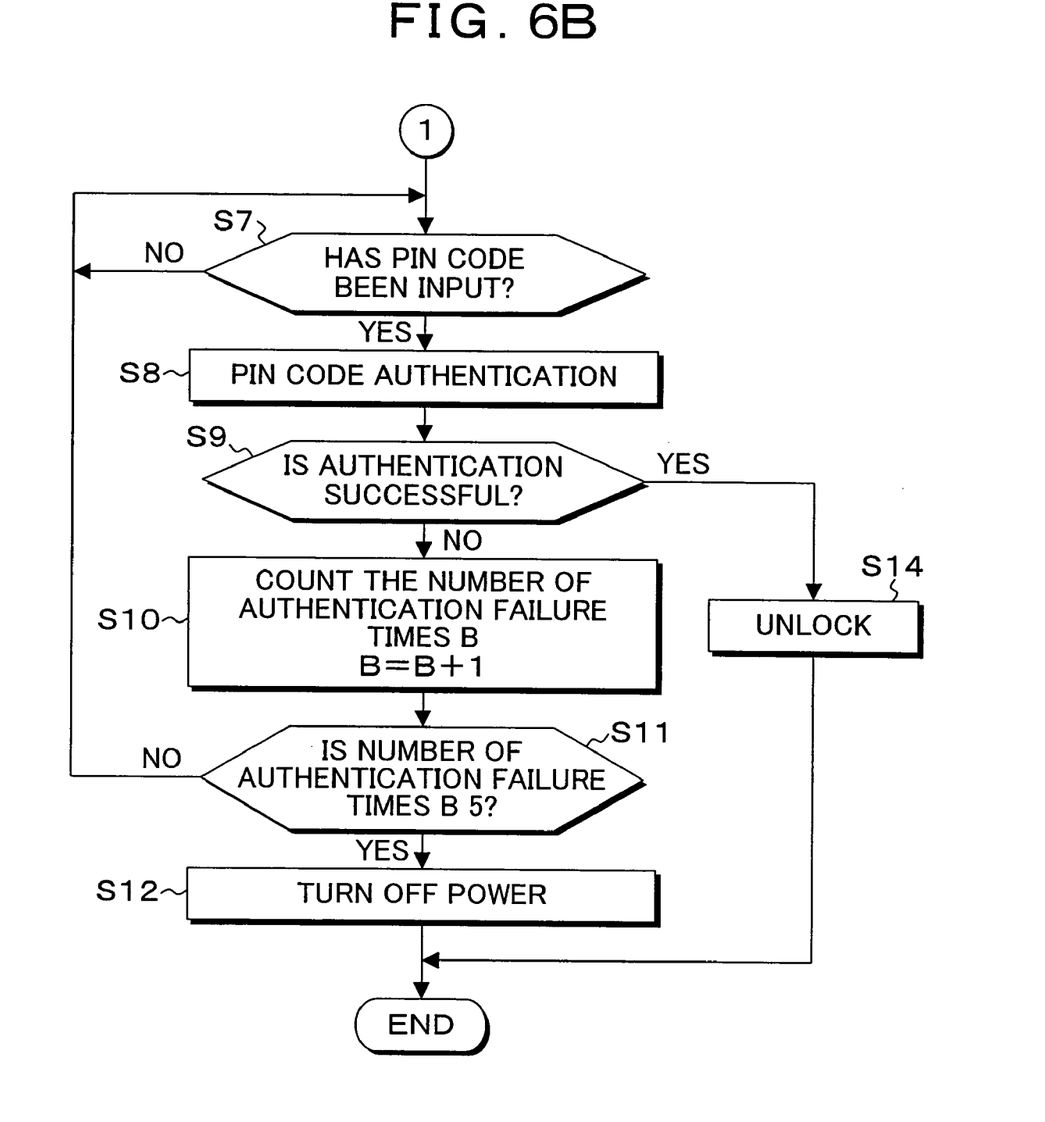

FIGS. 6A and 6B are flow charts of the combination authentication process in a case in which "use in combination with PIN code" is set as the operation mode, and the process flow herein is basically same as that in a conventional device. In FIGS. 6A and 6B, in the combination authentication process, whether a fingerprint has been input or not is checked in a step S1 wherein if a fingerprint has been input, the process proceeds to a step S2 in which fingerprint authentication is performed. When the fingerprint authentication is successful in a step S3, unlocking is performed in a step S13. When failure of fingerprint authentication is determined in the step S3, the number of authentication failure times A is counted up by one in a step S4. Then, in a step S5, whether the number of authentication failure times A has reached ten or not is checked, and the process from the step S1 is repeated until the number of authentication failure times A reaches ten. In this regard, the process is same as that of the steps S1 to S5 of the fingerprint authentication process of FIGS. 5A and 5B according to the present invention.

Subsequently, after the number of authentication failure times A is cleared such that A=0 in a step S6, the process proceeds to the authentication process by means of a PIN code starting from a step S7. The authentication process by means of a PIN code in this case is not a recovery process for the fingerprint authentication, but a PIN code authentication process which is performed when fingerprint authentication cannot be performed. In the PIN code authentication process, when PIN code input is determined in the step S7, the process proceeds to a step S8 wherein PIN code authentication for authenticating the input PIN code with respect to a previously registered PIN code is performed. When successful authentication is determined in a step S9, unlocking is performed in a step S14.

When authentication failure is determined, the process proceeds to a step S10 wherein the number of authentication failure times B is counted up by one. Then, until the number of authentication failure times B reaches five in a step S11, the process from the step S7 is repeated. When the number of authentication failure times B reaches five, the process proceeds from the step S11 to a step S12 wherein the power source is forcibly turned off.

As a result of the power source turnoff in the step S12, the number of authentication failure times B is cleared along with the power source turnoff. When the power source is turned on again after such forcible power source turnoff in the, step S12, the fingerprint authentication process of the steps S1 to S5 is repeated again, and when fingerprint authentication fails for ten times, the number of authentication failure times is cleared in the step S6. Then, the process goes into the PIN code authentication process of the steps S7 to S11, wherein when the PIN code authentication process fails for five times, the power source is forcibly turned off in the step S12. Thereafter, this process is repeated every time the power source is turned on again.

The number of authentication failure times B of the step S10 of FIGS. 6A and 6B may be also stored in the non-volatile memory 42, such that it can be counted as the initial value of authentication failure when the power source is turned on the next time.

Figure 7:
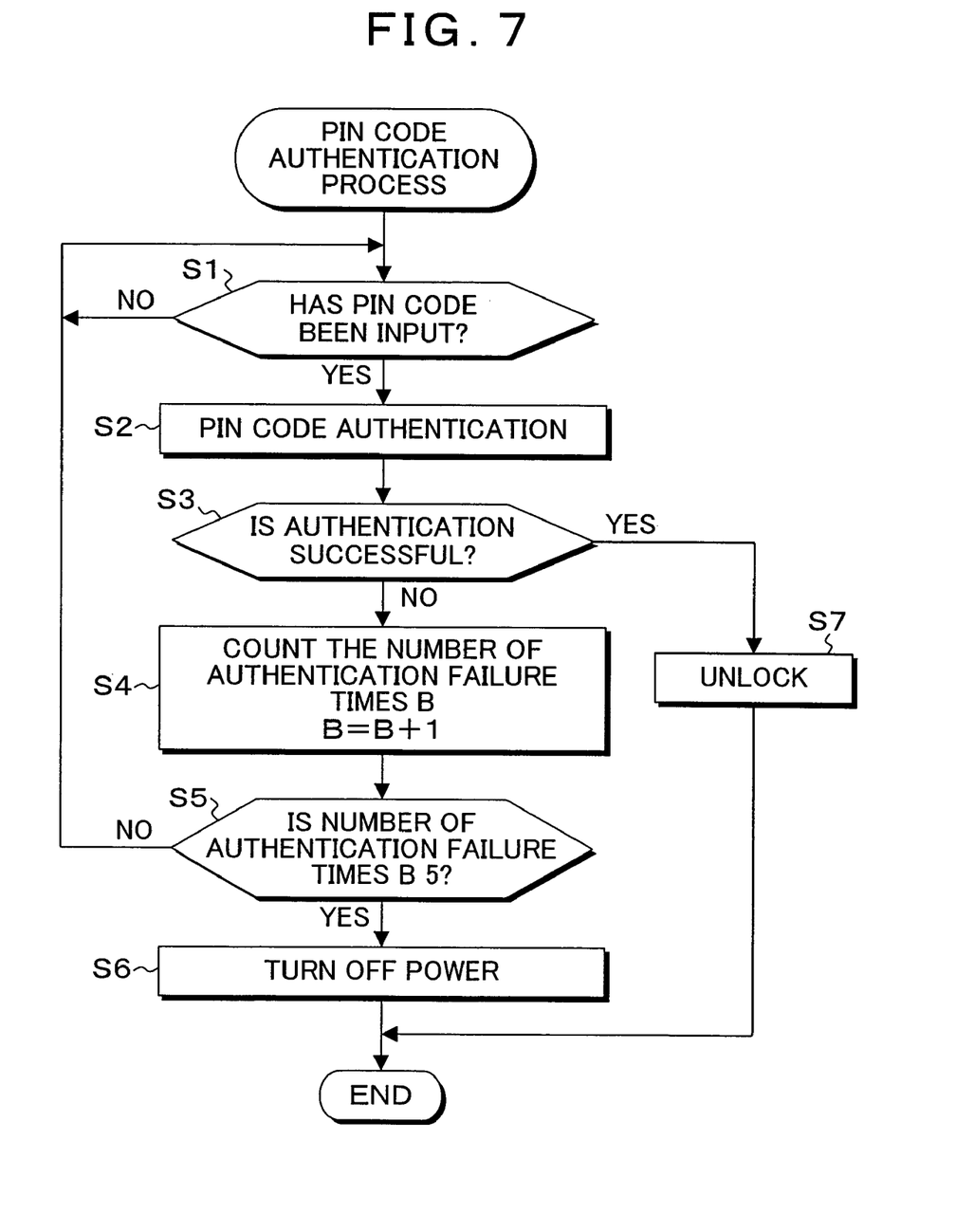
FIG. 7 is a flow chart of the PIN code authentication process when "do not use" is set as the operation mode.

FIG. 7 is a flow chart of the PIN code authentication process when "do not use fingerprint authentication" is set as the operation mode. In the PIN code authentication process, in a step S1, when a PIN code is input in accordance with a message urging PIN code input in the liquid crystal display 14, a PIN code authentication process is performed in a step S2, and when the authentication is successful in a step S3, the process proceeds to a step S7 wherein unlocking is performed.

When the authentication fails in the step S3, the number of authentication failure times B is counted up in a step S4. Then, until the number of authentication failure times B reaches five in a step S5, the process from the step S1 is repeated. When the number of authentication failure times reaches five in the step S5, the power source is turned off in a step S6. In accordance with the turnoff, the number of authentication failure times B is cleared such that B=0, and when the power source is turned on again, the process from the step S1 is repeated. Herein, the number of authentication failure times B of the step S5 of FIG. 7 may be also stored in the non-volatile memory 42, such that it can be counted as the initial value of authentication failure when the power source is turned on the next time.

Furthermore, the present invention provides a security management program executed by a computer of an information device, and the program comprises a program procedure having the flow according to the flow chart of the fingerprint authentication process of FIGS. 5A and 5B. In the above described embodiments, in addition to the case in which "use only fingerprint" for setting the operation mode of the fingerprint authentication process of the present invention is selected, as examples, there employed cases in which "use in combination with PIN code" or "do not use" which are operation modes of conventional fingerprint authentication is selected. However, as long as the processing function of the flow chart of the fingerprint authentication process of FIGS. 5A and 5B are provided by selecting "use only fingerprint" serving as the operation mode of the present invention, presence or absence of other operation modes does not impose limitation on the present invention.

Moreover, although the above described embodiments employ, as an example, the case in which the number of failure times in the fingerprint authentication process is ten, and the number of failure times in the PIN code authentication process performed as the subsequent recovery process is five; each of the numbers of failure times in the fingerprint authentication process and the PIN code authentication process may be arbitrary number of times in accordance with needs.

Moreover, although, in the above described embodiments, the number of failure times of the fingerprint authentication process for determining unauthorized use (or an input error) is ten, and the number of failure times of the PIN code authentication process serving as subsequent recovery is five which is fewer than the above described one, such that the number of retrievable fingerprint authentication is increased so as to correspond to fingerprint authentication errors other than unauthorized use; both the numbers of authentication failure times for determining unauthorized use may be the same number, or the number of the failure times of the PIN code authentication process may be larger than the number of the failure times of the fingerprint authentication process.

Moreover, although the above described embodiments employed, as an example, a portable terminal device such as a portable phone, the present invention is not limited thereto, and can be applied, without modification, to an arbitrary information device comprising a fingerprint sensor such as a PDA or a personal computer.

Moreover, the present invention includes arbitrary modifications that do not impair the objects and advantages thereof, and is not limited by the numerical values described in the above described embodiments.

What is claimed is:

1. A non-transitory computer readable storage medium which stores a computer program that, when executed by a computer, causes the computer to execute:

counting a number of times that a fingerprint authentication has failed, using a device which causes the counted number of times that fingerprint authentication has failed to be cleared after a power OFF in which power to the device was turned OFF and a subsequent power ON in which power is provided to the device;

allowing a user to feed a fingerprint for the fingerprint authentication if the counted number of times that the fingerprint authentication has failed is not greater than a first predetermined number of times;

changing from the fingerprint authentication to a PIN code authentication if the counted number of times that the fingerprint authentication has failed is greater than the first predetermined number of times; and after changing to the PIN code authorization, counting a number of times in which the PIN code authentication has failed, using a non-volatile memory unit in the device and which thereby retains the counted number of times in which the PIN code authentication has failed even when power to the non-volatile memory unit is turned OFF, allowing the user to feed a PIN code for the PIN code authentication if the counted number of times in which the PIN code authentication has failed is not greater than a second predetermined number of times, and preventing the user from feeding a PIN code for the PIN code authentication if the counted number of times in which the PIN code authentication has failed is greater than the second predetermined number of times.

2. An apparatus comprising:
a computer including:
- a first counter that counts a number of times that a fingerprint authentication has failed, wherein the apparatus causes the counted number of times that the fingerprint authentication has failed to be cleared after a power OFF in which power to the apparatus was turned OFF and a subsequent power ON in which power is provided to the apparatus;
- a fingerprint authentication control unit that allows a user to feed a fingerprint for the fingerprint authentication if the counted number of times that the fingerprint authentication has failed is not greater than a first predetermined number of times, wherein the apparatus changes from the fingerprint authentication to a PIN code authentication when the counted number of times that the fingerprint authentication has failed is greater than the first predetermined number of times;
- a second counter that counts a number of times in which the PIN code authentication has failed, using a non-volatile memory unit in the apparatus and which thereby retains the counted number of times in which the PIN code authentication has failed even when power to the non-volatile memory unit is turned OFF; and
- a PIN code authentication control unit that allows the user to feed a PIN code for the PIN code authentication if the counted number of times that the PIN code authentication has failed is not greater than a second predetermined number of times, and that prevents the user from feeding a PIN code for the PIN code authentication if the counted number of times that the PIN code authentication has failed is greater than the second predetermined number of times.

3. The non-transitory computer-readable storage medium which stores a computer program according to claim 1, wherein, when executed by a computer, the computer program causes the computer to further execute:
- after changing from the fingerprint authentication to the PIN code authentication, if the counted number of times that the PIN code authentication has failed is greater than the second predetermined number of times,
- changing from the PIN code authentication to the fingerprint authentication,
- allowing a user to feed a fingerprint for the fingerprint authentication without allowing the PIN code authentication, even if the counted number of times that the fingerprint authentication has failed is greater than a first predetermined number of times, and
- when the fingerprint authentication succeeds, clearing the counted number of times that the fingerprint authentication has failed and the number of times in which the PIN code authentication has failed.

* * * * *